(12) United States Patent
Hsiao

(10) Patent No.: US 8,050,723 B2
(45) Date of Patent: Nov. 1, 2011

(54) PORTABLE ELECTRONIC DEVICE HAVING SOLAR CELL MODULE

(75) Inventor: Bor-Yuan Hsiao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 628 days.

(21) Appl. No.: 12/143,642

(22) Filed: Jun. 20, 2008

(65) Prior Publication Data
US 2009/0137287 A1    May 28, 2009

(30) Foreign Application Priority Data

Nov. 28, 2007    (CN) .......................... 2007 1 0202734

(51) Int. Cl.
*H04M 1/00* (2006.01)
*H04B 1/38* (2006.01)

(52) U.S. Cl. ..... 455/573; 455/572; 455/574; 455/575.1; 455/575.8; 455/556.1; 455/343.6; 455/347; 320/101; 320/107; 320/108; 320/114; 320/115

(58) Field of Classification Search .... 455/556.1–556.2, 455/557, 572–574, 575.1, 575.8, 90.3, 343.6, 455/347–349; 320/101, 107, 108, 114, 115
See application file for complete search history.

(56) References Cited

U.S. PATENT DOCUMENTS

| 5,409,550 A * | 4/1995 | Safir ............................. 136/246 |
| 2008/0157711 A1* | 7/2008 | Chiang et al. ................ 320/101 |
| 2009/0085513 A1* | 4/2009 | Yao ............................... 320/101 |

* cited by examiner

*Primary Examiner* — Tuan A Tran
(74) *Attorney, Agent, or Firm* — Altis Law Group, Inc.

(57) ABSTRACT

A portable electronic device includes a main body and a solar cell module. The main body has electric components. The solar cell module is mounted in the main body. The solar cell module is configured for supplying electric energy to the electric components of the main body. The solar cell module includes a solar cell, a cell cover and a light diverging lens. The solar cell has a light-absorbing surface. The cell cover faces the light-absorbing surface. The cell cover defines a through hole therein. The light diverging lens is engaged in the through hole. The light diverging lens faces toward the light-absorbing surface and is configured for diverging light transmitted therethrough.

11 Claims, 3 Drawing Sheets

PORTABLE ELECTRONIC DEVICE HAVING SOLAR CELL MODULE

BACKGROUND

1. Technical Field

The invention relates generally to a portable electronic device having a solar cell module.

2. Description of Related Art

As electronic technology develops, portable electronic device such as mobile phones and laptops are commonly used. A conventional portable electronic device generally includes a main body and a rechargeable battery. The rechargeable battery supply electric energy to the main body for usage. The rechargeable batteries can be charged many times by a charger using an alternating current power source. Conventional rechargeable batteries include nickel-cadmium (Ni—Cd) batteries, nickel-hydrogen (Ni—H) batteries, lithium-ion (Li-ion) batteries, etc. The rechargeable batteries can be discharged then recharged thousands of times.

In general, a kind of mobile phone can only use a particular kind of rechargeable battery and the rechargeable battery can be charged only with a matched charger. In other words, the rechargeable battery of the mobile phone cannot be charged without the corresponding charger. Therefore, a situation often arises where the battery cannot be recharged in a given time and may lead to inconveniences for the users. This problem has called for a new kind of battery that doesn't need a particular charger.

At present, solar cells are used to supply the electrical energy to the portable electronic devices. The solar cell can generate electric energy through photoelectric conversion (see "Grown Junction GaAs Solar Cell", Shen, C. C.; Pearson, G. L.; Proceedings of the IEEE, Volume 64, Issue 3, March 1976, Pages: 384-385). The solar cell has a light-absorbing surface for absorbing light. When sunlight or other ambient light irradiates the light-absorbing surface, the solar cell converts the absorbed light into electric energy. The electric energy is then stored in the solar cell. However, when the light-absorbing surface is exposed to an external environment, abrasion may occur thereon and dust may contaminate the light-absorbing surface. Additionally, the light-absorbing surface generally has a black color, which may influence external appearance of the portable electronic device.

What is needed, therefore, is a portable electronic device having a solar cell module with a fine appearance and preventing from abrasion.

SUMMARY

In an exemplary embodiment of the present invention, a portable electronic device includes a main body and a solar cell module. The main body has electric components. The solar cell module is mounted in the main body. The solar cell module is configured for supplying electric energy to the electric components of the main body. The solar cell module includes a solar cell, a cell cover and a light diverging lens. The solar cell has a light-absorbing surface. The cell cover faces the light-absorbing surface. The cell cover defines a through hole therein. The light diverging lens is engaged in the through hole. The light diverging lens faces toward the light-absorbing surface and is configured for diverging light transmitted therethrough.

Other advantages and novel features of the present portable electronic device will become more apparent from the following detailed description of preferred embodiments, when taken in conjunction with the accompanying drawings.

BRIEF DESCRIPTION OF THE DRAWINGS

Many aspects of the present portable electronic device can be better understood with reference to the following drawings. The components in the drawing are not necessarily drawn to scale, the emphasis instead being placed upon clearly illustrating the principles of the present portable electronic device. Moreover, in the drawings, like reference numerals designate corresponding parts throughout the several views.

DETAILED DESCRIPTION OF PRESENT EMBODIMENTS

Embodiments of the present portable electronic device will now be described in detail below and with reference to the drawings.

Figure 1:
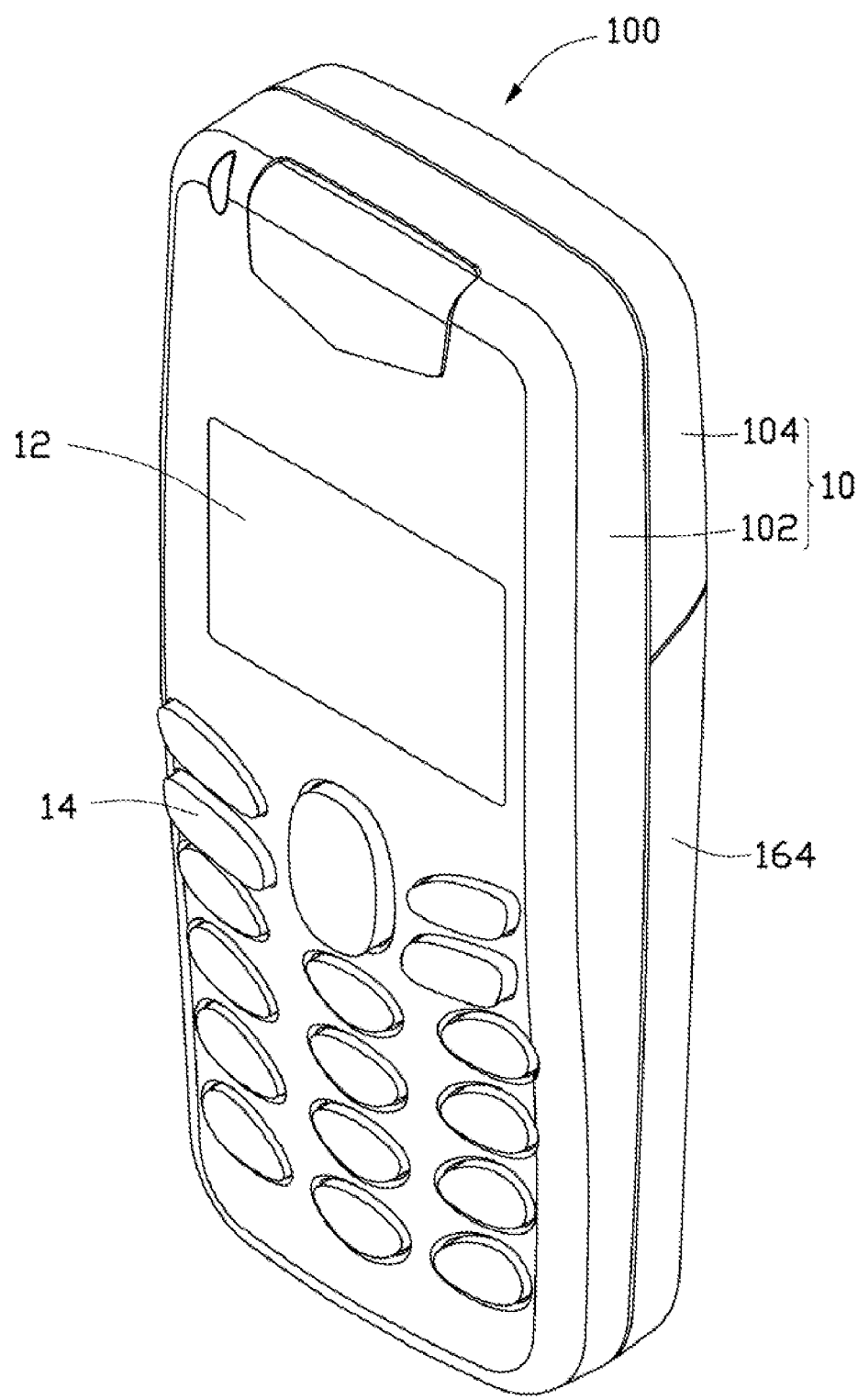
FIG. 1 is a perspective, schematic view of a mobile phone in accordance with a first exemplary embodiment.
Figure 2:
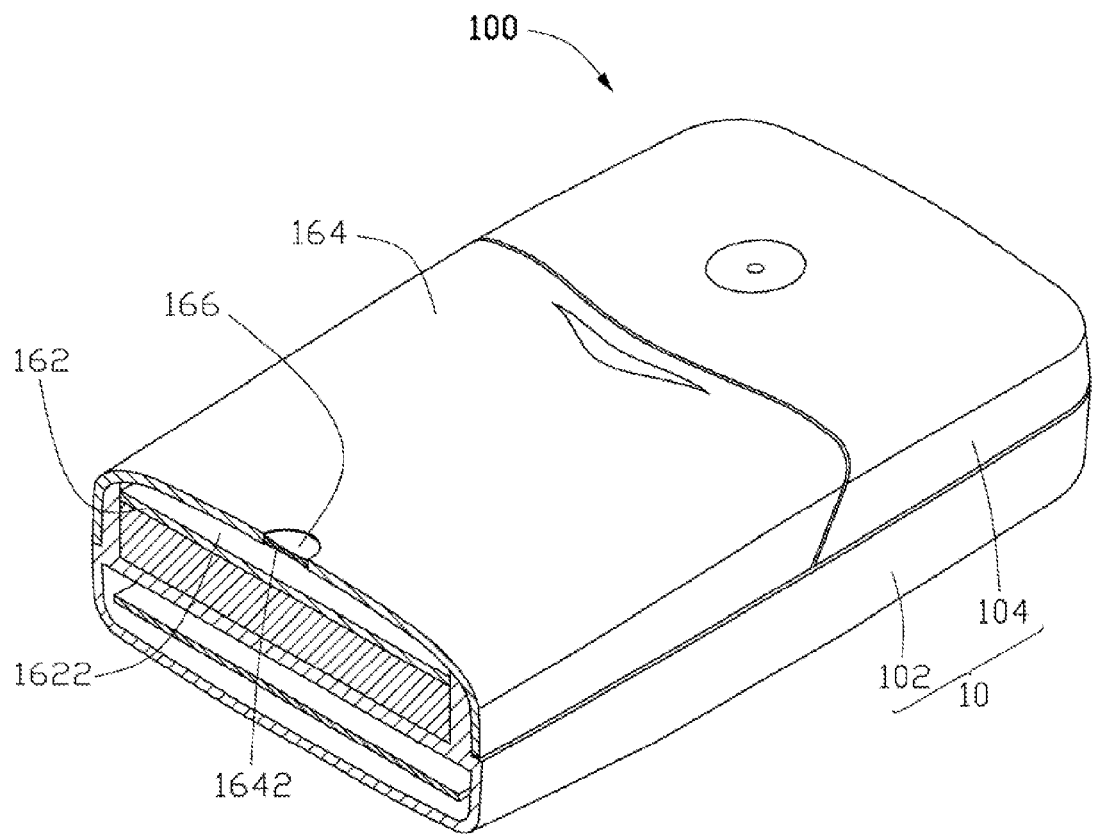
FIG. 2 is a cutaway, schematic view of the mobile phone of FIG. 1.

Referring to FIGS. 1 and 2, a portable electronic device is provided in accordance with a first exemplary embodiment. In the present embodiment, the portable electronic device is a mobile phone 100. The mobile phone 100 includes a main body 10, a display screen 12, a keypad 14, a solar cell 162 and a cell cover 164.

The main body 10 includes a front cover 102 and a back cover 104. The cell cover 164 and the back cover 104 are adjacent to each other and are both connected with the front cover 102 to form a housing of the mobile phone 100. A printed circuit board (not shown), a radio frequency module (not shown) and the solar cell 162 are secured in the housing of the mobile phone 100. The solar cell 162 is located facing the cell cover 164 and is detachable. The cell cover 164 can be comprised of an opaque material, e.g. plastic or metal. The material of the cell cover 164 can be same as that of the front cover 102 and the back cover 104.

The display screen 12 is disposed on the upper portion of the front cover 102. The display screen 12 is configured for displaying figures, letters or other contents thereof. The display screen 12 can be a liquid crystal display or a light-emitting diode display.

The keypad 14 (i.e., the input module) is disposed generally on the lower portion of the front cover 102. The keypad 14 is configured for inputting selected signals (e.g., dialing, data entry, etc.).

The solar cell 162 has a light-absorbing surface 1622 configured for absorbing sunlight or other ambient light. The light-absorbing surface 1622 usually has a black color. When the light irradiates the light-absorbing surface 1622, the solar cell 162 converts the absorbed light into electric energy. The electric energy is then stored in the solar cell 162. The solar cell 162 is configured for supplying electric energy to components within the mobile phone 100 for usage.

A through hole 1642 is defined in the cell cover 164. A light diverging lens 166 is disposed in the through hole 1642. The side face of the light diverging lens 166 is adhered to an inner wall 1644 of the through hole 1642 by adhesive. An optical axis of the light diverging lens 166 is perpendicular to the light-absorbing surface 1622. The light diverging lens 166 is configured for guiding and diverging light transmitted therethrough. Preferably, the light diverging lens 166 and the light-absorbing surface 1622 are spaced from each other so that the light entering through the light diverging lens 166 can be diverged to a sufficient large area onto the light-absorbing surface 1622. The solar cell 162 and the cell cover 164 are both detachable.

It is to be understood that the solar cell 162 can be integrally connected with the cell cover 164, thus the solar cell 162 and the cell cover 164 form a solar cell module. The solar cell module is detachably mounted in the main body 10. At that moment, the solar cell module is detachably connected with the main body 10 of the mobile phone 100. In addition, the back cover 104 and the cell cover 164 can be integrally connected with each other.

According to this exemplary embodiment, the solar cell 162 is covered by the cell cover 164 and the light diverging lens 166, thereby preventing the light-absorbing surface 1622 of the solar cell 162 from being scraped and contaminated by the dust. The black color of the light-absorbing surface 1622 is shielded by the cell cover 164 so that the mobile phone 100 has a fine appearance. In addition, because of the light diverging lens 166, a large area of the light-absorbing surface 1622 is irradiated by the sunlight or other ambient light thus, the electric energy can be generated rapidly.

Figure 3:
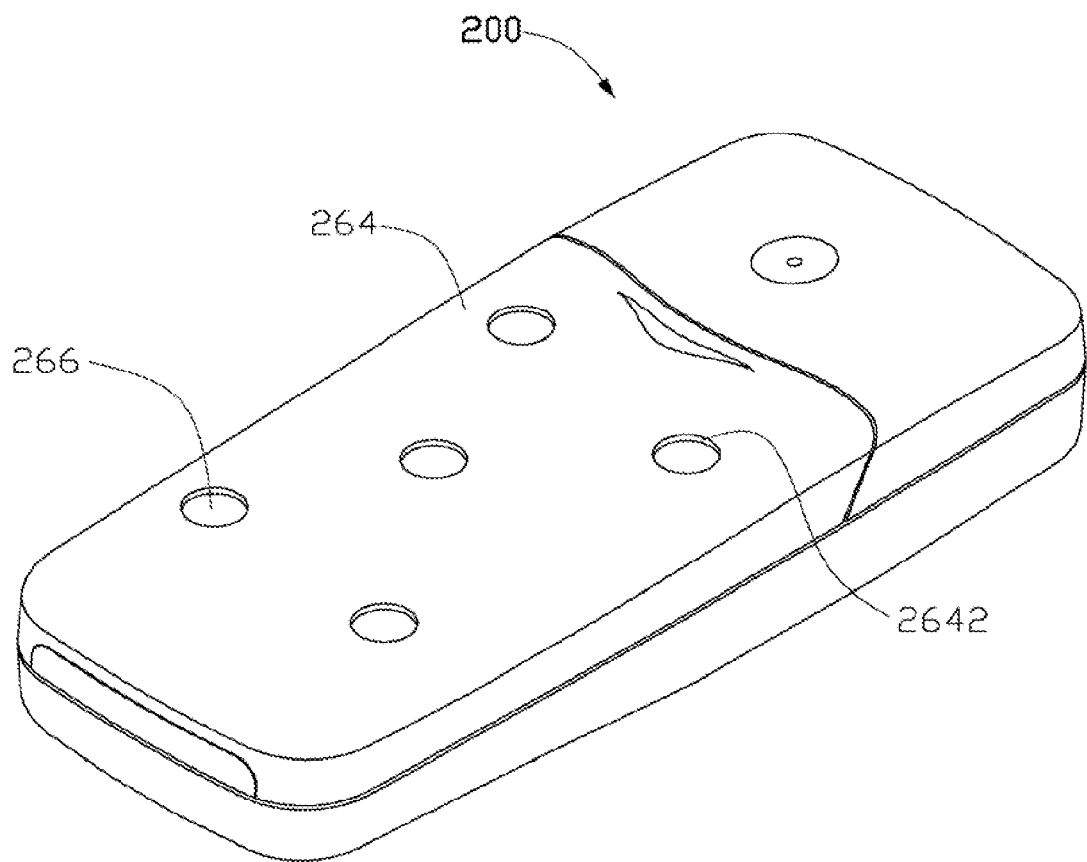
FIG. 3 is a perspective, schematic view of another mobile phone in accordance with a second exemplary embodiment.

Referring to FIG. 3, another mobile phone 200 is illustrated in accordance with a second exemplary embodiment. The mobile phone 200 is similar as the mobile phone 100 in the first exemplary embodiment. The mobile phone 200 includes a cell cover 264, a plurality of light diverging lenses 266 and a solar cell (not shown) same as the solar cell 162 in the first exemplary embodiment. The cell cover 264 defines a corresponding number of through holes 2642 for receiving the light diverging lenses 266 therein. The through holes 2642 can be distributed in any pattern. Certainly, the through holes 2642 can also be regularly defined in an array. The cell cover 264 covers the light-absorbing surface of the solar cell.

It is to be understood that the portable electronic device can also be a laptop, a personal digital assistant (PDA), etc. The light diverging lens 166 or 266 can also be replaced with lens group comprising a plurality of lenses having a same function as the light diverging lens 166 or 266.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A portable electronic device comprising:
   a main body having electric components;
   a solar cell module mounted in the main body, the solar cell module being configured for supplying electric energy to the electric components of the main body, the solar cell module comprising:
   a solar cell having a light-absorbing surface;
   a cell cover facing the light-absorbing surface, the cell cover defining a through hole therein;
   a light diverging lens engaged in the through hole, the light diverging lens facing toward the light-absorbing surface and being configured for diverging light transmitted therethrough to a sufficient large area on the light-absorbing surface.

2. The portable electronic device as claimed in claim 1, wherein the solar cell and the cell cover are integrally connected with each other.

3. The portable electronic device as claimed in claim 1, wherein the light diverging lens is spaced from the light-absorbing surface.

4. The portable electronic device as claimed in claim 1, wherein an optical axis of the light diverging lens is perpendicular to the light-absorbing surface.

5. The portable electronic device as claimed in claim 1, wherein the cell cover is comprised of an opaque material.

6. The portable electronic device as claimed in claim 1, wherein the cell cover covers the entire light-absorbing surface of the solar cell.

7. The portable electronic device as claimed in claim 1, wherein the main body comprises a front cover and a back cover alongside of the cell cover, the cell cover, the back cover and the front cover cooperatively forming a housing, the solar cell received in the housing.

8. The portable electronic device as claimed in claim 1, wherein the light diverging lens is entirely received in the through hole.

9. The portable electronic device as claimed in claim 8, wherein the light diverging lens is recessed in the cell cover.

10. A portable electronic device comprising:
    a main body having a first surface, an opposite second surface, and a display screen mounted on the first surface, the second surface having a through hole defined therein;
    a solar cell received in the main body, the solar cell having a light-absorbing surface facing the through hole; and
    a light diverging lens engaged in the through hole, the light diverging lens configured for diverging light transmitted therethrough to a sufficient large area on the light-absorbing surface.

11. A portable electronic device comprising:
    a main body having an upper surface, a display screen mounted in the upper surface, and a lower cover detachably coupled to an opposite side of the main body to the display screen, the lower cover having a through hole defined therein;
    a solar cell received in the main body between the upper surface and the lower cover, the solar cell having a light-absorbing surface facing the through hole; and
    a light diverging lens engaged in the through hole, the light diverging lens configured for diverging light transmitted therethrough to a sufficient large area on the light-absorbing surface.

* * * * *